US010389550B1

(12) United States Patent
Bharadwaj

(10) Patent No.: US 10,389,550 B1
(45) Date of Patent: Aug. 20, 2019

(54) PRIORITY TAGGING BASED SOLUTIONS IN FC SANS INDEPENDENT OF TARGET PRIORITY TAGGING CAPABILITY

(71) Applicant: Cisco Technology, Inc., San Jose, CA (US)

(72) Inventor: Harsha Bharadwaj, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/949,521

(22) Filed: Apr. 10, 2018

(51) Int. Cl.
*H04L 12/40* (2006.01)
*H04L 12/751* (2013.01)
*H04L 29/08* (2006.01)

(52) U.S. Cl.
CPC ........ *H04L 12/40143* (2013.01); *H04L 45/02* (2013.01); *H04L 67/1097* (2013.01)

(58) Field of Classification Search
CPC ............... H04L 12/40143; H04L 45/02; H04L 67/1097
See application file for complete search history.

(56) References Cited

U.S. PATENT DOCUMENTS

| 8,553,710 | B1 * | 10/2013 | White | H04L 49/10 370/389 |
|---|---|---|---|---|
| 10,055,241 | B1 * | 8/2018 | DeSanti | G06F 9/45558 |
| 2010/0115132 | A1 | 5/2010 | Hirata et al. | |
| 2011/0022694 | A1 | 1/2011 | Dalal et al. | |
| 2011/0029973 | A1 | 2/2011 | Hara et al. | |
| 2011/0173608 | A1 | 7/2011 | Buragohain et al. | |
| 2011/0173609 | A1 | 7/2011 | Buragohain et al. | |
| 2014/0092898 | A1 | 4/2014 | Berman | |
| 2015/0007180 | A1 | 1/2015 | Sharp et al. | |
| 2015/0180773 | A1 | 6/2015 | DeCusatis et al. | |
| 2015/0188730 | A1 | 7/2015 | Iwata | |
| 2015/0339180 | A1 | 11/2015 | Shih et al. | |
| 2016/0246631 | A1 | 8/2016 | Tsirkin | |
| 2016/0291997 | A1 | 10/2016 | Bernal et al. | |
| 2017/0054685 | A1 | 2/2017 | Malkov et al. | |

OTHER PUBLICATIONS

Howard L. Johnson et al., "FC-NWSG Virtual Machine Support", T11/15-209v0, Jun. 2015, 9 pgs.

(Continued)

*Primary Examiner* — Duc C Ho
(74) *Attorney, Agent, or Firm* — Edell, Shapiro & Finnan, LLC

(57) ABSTRACT

A host bus adapter of a target device is associated with a Fiber Channel driver and is connected to a Fiber Channel switch fabric. The host bus adapter receives from the switch fabric an inbound frame having a header including a source identifier and a virtual machine (VM) tag, stores a mapping between the source identifier and the VM tag, and passes the inbound frame to the Fiber Channel driver. The host bus adapter receives from the Fiber Channel driver an outbound frame having a header including a destination identifier, and determines, based on the mapping, whether there is a match at least between the source identifier of the inbound frame and the destination identifier of the outbound frame. If there is a match, the host bus adapter tags the header of the outbound frame with the VM tag, and transmits the tagged outbound frame to the switch fabric.

20 Claims, 11 Drawing Sheets

(56) References Cited

OTHER PUBLICATIONS

VMware, Ports in Fibre Channel SAN', retrieved via URL: https://docs.vmware.com/en/VMware-vSphere/5.5/com.vmware.vsphere.storage.doc/GUID-83440634-62AC-414B-B2C1-9EB922B1B58D.html, May 5, 2013, 1 pg.

American National Standard for Information Technology, "Fibre Channel", American National Standard of Accredited Standards Committee INCITS, Jun. 4, 2009, 180 pgs.

Cavium, "VM Aware Fibre Channel", In-depth Virtual Machine Traffic Visibility for SANs, SN0530954-00 Rev. B, White Paper, Oct. 2017, 4 pgs.

\* cited by examiner

| SERVICE PARAMETER | WORD | BITS | DEFAULT LOGIN VALUE | PLOGI AND PLOGI LS_ACC PARAMETER APPLICABILITY | | | FLOGI PARAMETER APPLICABILITY | | | FLOGI LS_ACC PARAMETER APPLICABILITY | | |
|---|---|---|---|---|---|---|---|---|---|---|---|---|
| | | | | CLASS | | | CLASS | | | CLASS | | |
| | | | | 2 | 3 | | 2 | 3 | | 2 | 3 | |
| PRIORITY TAGGING SUPPORTED | 1 | 23 | 0 | y | y | | y | y | | y | y | |

302

| SERVICE PARAMETER | WORD | BITS | DEFAULT LOGIN VALUE | PLOGI AND PLOGI LS_ACC PARAMETER APPLICABILITY | | | FLOGI PARAMETER APPLICABILITY | | | FLOGI LS_ACC PARAMETER APPLICABILITY | | |
|---|---|---|---|---|---|---|---|---|---|---|---|---|
| | | | | CLASS | | | CLASS | | | CLASS | | |
| | | | | 2 | 3 | | 2 | 3 | | 2 | 3 | |
| PRIORITY | 1 | 23 | 0 | y | y | | y | y | | y | y | |

304

Nx_PORT
0 = NON-ZERO PRIORITY MAY BE TOLERATED
1 = NON-ZERO PRIORITY SHALL BE TOLERATED

Fx_PORT
0 = PRIORITY IS NOT SUPPORTED
1 = PRIORITY IS SUPPORTED

FIG.3

PRIORITY TAGGING BASED SOLUTIONS IN FC SANS INDEPENDENT OF TARGET PRIORITY TAGGING CAPABILITY

TECHNICAL FIELD

The present disclosure relates to priority tagging capable Fibre Channel (FC) storage area networks (SANs) (FC-SANs).

BACKGROUND

Visibility of VMs by way of their VM tags (also referred to as "VM identifiers") in an FC-SAN environment offers advanced analytics at the granularity of a VM, detection and congestion isolation of slow draining VMs, and fabric policy (e.g., zoning, Quality-of-Service (QoS), and the like) per VM; however, current solutions for providing such VM visibility are incomplete. On the server-side of the FC-SAN, server-side FC drivers may be priority tagging capable, i.e., may tag FC frames with VM tags and/or recognize and process the VM tags in tagged FC frames. Also, the FC-SAN switch fabric may be priority tagging capable; however, on the target-side of the FC-SAN, target-side FC drivers may or may not be priority tagging capable. Given the many target-side vendors (e.g., storage array vendors) in the market today, it may be years before all of the vendors implement priority tagging capability, and thus years before realizing the goal of an end-to-end priority tagging capable FC-SAN environment.

BRIEF DESCRIPTION OF THE DRAWINGS

FIG. 3 shows formats for common service parameters and class service parameters use for port login (PLOG)/Fabric login (FLOGI) as defined in accordance with the T11 standards, according to an example embodiment.

DESCRIPTION OF EXAMPLE EMBODIMENTS

Overview

Figure 1:
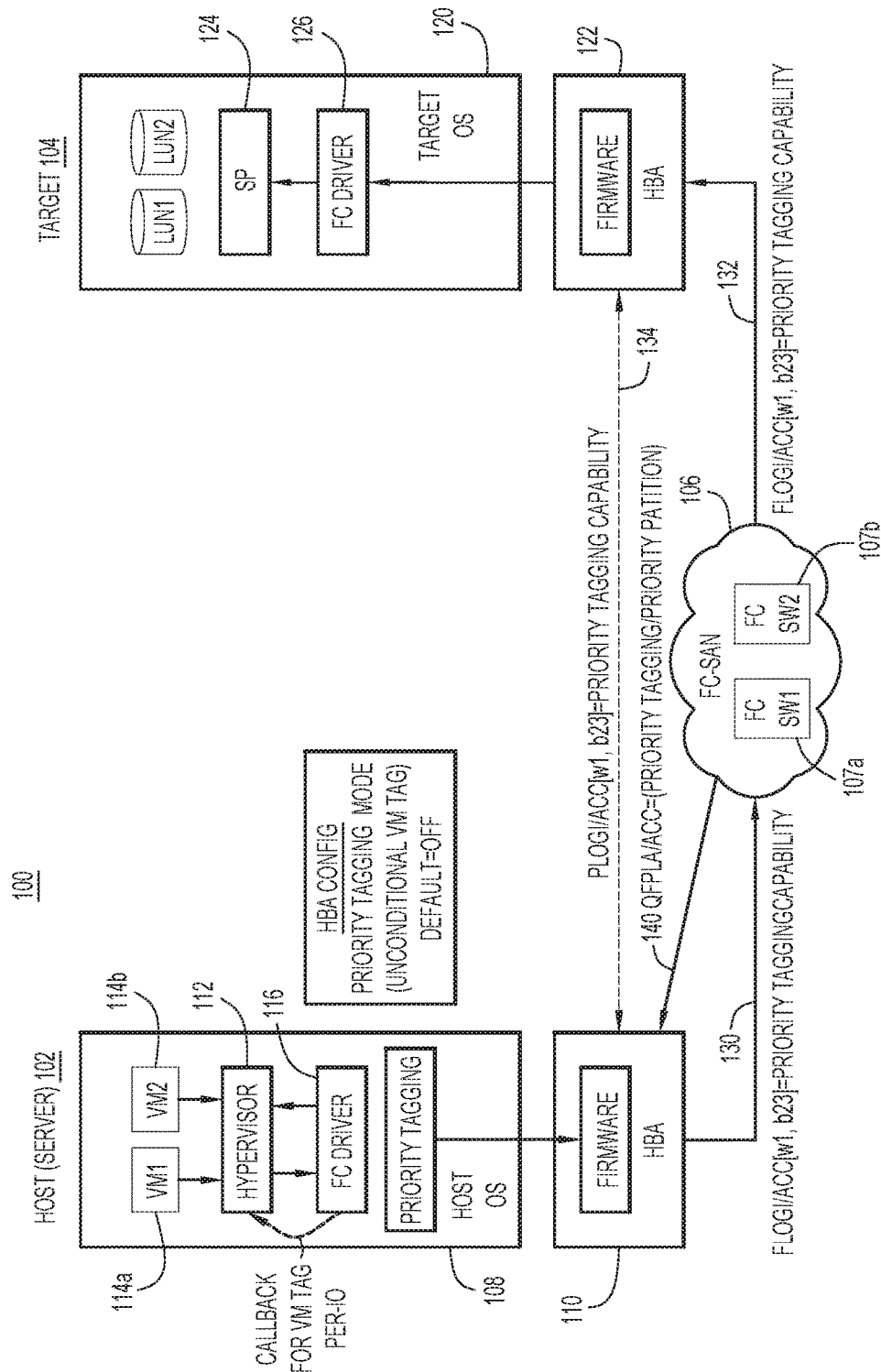
FIG. 1 is a block diagram of an example FC-SAN environment in which embodiments directed to enabling priority tagging capability, such as priority tagging of FC frames, independent of a target device may be implemented, according to example embodiment.

In one embodiment, a host bus adapter of a target device is associated with a Fibre Channel driver and is connected to a Fibre Channel switch fabric. The host bus adapter receives from the Fibre Channel switch fabric an inbound frame having a Fibre Channel header including a source identifier and a virtual machine (VM) tag, stores in a memory a mapping between the source identifier and the VM tag, and passes the inbound frame to the Fibre Channel driver. The host bus adapter receives from the Fibre Channel driver an outbound frame having a Fibre Channel header including a destination identifier, and determines, based on the mapping, whether there is a match at least between the source identifier of the inbound frame and the destination identifier of the outbound frame. If there is a match, the host bus adapter tags the Fibre Channel header of the outbound frame with the VM tag, and transmits the tagged outbound frame to the Fibre Channel switch fabric.

In another embodiment, a host device is configured to host a virtual machine identified by a VM tag and to connect with a Fibre Channel switch fabric through a host bus adapter of the host device. The host device discovers whether the Fibre Channel switch fabric and the target device are each priority tagging capable such that each is configured to perform either priority tagging of a Priority field of frames or interpreting of the Priority field as a VM tag. If the Fibre Channel switch fabric and the target device are both priority tagging capable, the host device performs priority tagging of frames carrying traffic originated at the virtual machine and destined for the target device via the Fibre Channel switch fabric. If the Fibre Channel switch fabric and the target device are not both priority tagging capable, the host device tests whether a Liberal Mode feature of the host device is set to ON or OFF. If the Liberal Mode feature is set to ON or OFF, the host device either performs the priority tagging of the frames or does not perform the priority tagging of the frames, respectively.

In yet another embodiment, a Fibre Channel switch of a switch fabric receives a frame originated at a host device connected to the switch fabric and destined for a target device connected to the switch fabric. The frame has a Fibre Channel header including a Priority field. The Fibre Channel switch determines whether the host device performs priority tagging of the Priority field, and determines whether the Priority field carries a VM tag without priority. If the host device performs the priority tagging and the Priority field carries the VM tag without priority, the Fibre Channel switch determines whether the target device uses the Priority field for frame prioritization and, if the target device uses the Priority field for the frame prioritization, the Fibre Channel switch clears the VM tag without priority from the Priority field, and forwards the frame to the target device. If the host device does not perform the priority tagging or if the Priority field does not carry the VM tag without priority, the Fibre Channel switch does not clear the VM tag, and forwards the frame to the target device.

EXAMPLE EMBODIMENTS

The evolution from traditional bare metal servers to highly virtualized servers, such as virtual machines (VMs), is happening rapidly. In most implementations, VMs accesses external storage through a virtualized HBA (vHBA) which connects to a physical FC-SAN (also referred to as an "FC switch fabric," and an "FC fabric") for performing IO operations. The VMs hosted on a server are connected to each other through a virtual switch also hosted on the server and then to the physical FC-SAN, adding a layer of abstraction and complexity. To cater to this evolution, FC-SANs need to provide for fine grained fabric-wide visibility of VMs.

To address this requirement in SANs, the International Committee for Information Technology Standards (INCITS) T11 standards for FC (e.g., FC-SW, FC-LS, and FC-GS) define a Virtual Entity (VE), which can be any virtualized resource in the FC fabric. The VE manager (e.g., a hypervisor) managing this resource registers the VE in a virtual entity identification (VEID) server offered as a directory service subtype in the FC fabric. The VE can be either a VM or container or an application identifier (ID) and shall be referred to generically as a "VM" in the ensuing description. The FC fabric registration, to the VEID server, associates a global universally unique identifier (UUID) of the VM to an FC identifier (FCID), local VM tag tuple. The tuple (FCID, local VM tag) can change if the VM moves to another server while the global UUID acts as a unique identifier though out the lifetime of the VM. The T11 standards define a method for the VE manager (e.g., hypervisor) to tag or encode the FC traffic (e.g., FC frames) of a specific VM with the local VM tag to be carried in an 8-bit a Priority field of the FC header. Populating the Priority field with the VM tag is referred to as inband "priority tagging." Priority tagging on an FC frame-by-frame basis enables the FC fabric and storage targets (referred to simply as "targets") to identify FC traffic as belonging to a specific VM. Priority tagging may also be referred to as "VM tagging" or simply "tagging."

As used herein a device is "priority tagging capable" or "supports priority tagging" if the device is configured to perform priority tagging of FC frames and/or to properly recognize/interpret/process (collectively "interpret") the VM tag in FC frames (i.e., properly interpret a VM tag in the Priority field as a VM tag). Otherwise, the device is considered not to be priority tagging capable. Such priority tagging capability is learned from an exchange of Common/Class Service Parameters during various login processes mentioned below. An end device (e.g., a host/server device or a target device) connected to the FC fabric and the FC fabric mutually discover their respective priority tagging capabilities during a Fabric login (FLOGI) phase of the end devices with the FC fabric. The end devices mutually discover their respective priority tagging capabilities during a port login (PLOGI) phase between the end devices via the FC fabric. According to the T11 standards, the host/server (originator of IO operations) enables priority tagging only when both the FC fabric and the target device are both priority tagging capable. Also, the T11 standards require the target device to preserve the VM tag from an IO request in the IO response of an IO operation exchange. Further, all the IO operations sourced from a VM to a target device (e.g., storage) touch the physical FC fabric infrastructure because the target is external (i.e., the storage cannot be soft-switched internally). As a result, the FC fabric gains full bi-directional visibility to all the IO operations from a VM within the FC-SAN fabric.

With reference to FIG. 1, there is a block diagram of an example generalized FC-SAN environment 100 (also referred to as an "FC fabric environment") that incorporates features described above and in which embodiments presented herein may be implemented. FC-SAN environment 100 includes a host-side device 102 (also referred to as a "host device," "host," and "server"), a target-side device 104 (also referred to as a "target device" or simply "target"), and an FC switch fabric 106 (also referred to as an "FC fabric 106") connected to both the host and the target and through which the host and the target communicate with each other. FC fabric 106 includes a network of FC switches 107a and 107b (collectively referred to as "FC switches 107" and individually referred to as an "FC switch 107") connected with each other. In practice, FC fabric 106 typically includes many more than two FC switches. FC fabric 106 supports bi-directional flows of FC frames (also referred to simply as "frames") between host 102 and target 104 in a host-to-target direction ("inbound" direction), and in a target-to-host direction ("outbound direction").

Host 102 includes one or more server devices (or "servers") (not specifically shown in FIG. 1) to host a host operating system (OS) 108, and also includes a host HBA 110 configured to communicate with the one or more servers and FC fabric 106. OS 108 includes a hypervisor 112 to host virtual machines (VMs) 114a ("VM1") and 114b ("VM2") (collectively referred to as "VMs 114" and singularly referred to as a "VM 114"), and also includes a host FC driver 116 configured to communicate with HBA 110 and hypervisor 112. In an example, HBA 110 includes firmware to implement operations performed by the HBA. On the host side, typically, both FC driver 116 and/or HBA 110/HBA firmware are developed by FC HBA vendors.

Target 104 represents a high volume memory storage device and hosts a target OS 120 configured to communicate with a target HBA 122 connected with FC fabric 106. In an example, HBA 122 includes firmware to implement HBA operations. OS 120 includes a target storage processor (SP) 124 and a target FC driver 126 to communicate with the SP and HBA 122. SP 124 provides Input-Output (IO) access to high volume target memory partitioned into logical unit numbers (LUNs) LUN1 and LUN2. On the target side, while HBA 122/HBA firmware is typically developed by an HBA vendor, and FC driver 126 is developed by a respective storage vendor.

Operation of FC-SAN environment 100 includes initial FLOGI and PLOGI phases or procedures to configure host 102, target 104, and FC fabric 106 with various operational parameters used for subsequently exchanging data traffic in the form of FC frames between the host and the target over the FC fabric. During the FLOGI procedures, host 102, target 104, and FC fabric 106 each discover which of the host, the target, and the FC fabric is/are priority tagging capable. Specifically, host 102 exchanges control plane FLOGI messages 130 with FC fabric 106, and target 104 exchanges FLOGI messages 132 with the FC fabric. FLOGI messages 130 and 132 each include a request message and an acknowledgement/accept (ACC) message responsive to the request message, and which indicates whether the originator of the ACC message is or is not priority tagging capable. For example, in the ACC message, word 1 (w1), bit 23 (b23) (denoted [w1, b23]) indicates the priority tagging capability. During the PLOGI procedures, host 102 and target 104 each discover which of the host and the target is/are priority tagging capable. Specifically, host 102 exchanges control plane PLOGI messages 134 with target 104. PLOGI messages 134 include the ACC message which indicates whether the originator of the ACC message is or is not priority tagging capable.

Once the FLOGI and PLOGI phases are completed, host 102 may perform/initiate a data plane IO operation, such as a read or a write request, on target 104 over FC fabric 106. The IO operation translates to a sequence of FC frames exchanged between host 102 and target 104. In the host-to-target (inbound) direction, VMs 114 originate an IO request destined for target 104 and forward the IO request to hypervisor 112, which forwards the IO request to FC driver 116. FC driver 116 performs operations that bind an IO path of the IO request to HBA 110. Specifically, assuming priority tagging is enabled for host 102, FC driver 116 retrieves a VM tag for the IO request from hypervisor 112, and forwards/passes the VM tag along with the associated IO request to HBA 110. HBA 110 performs FC framing and priority tagging of the IO request to encapsulate the IO request in an FC frame that is tagged with the VM tag (i.e., "VM tagged"). In other words, HBA 110 packages or encodes the IO request into an FC frame, tags/populates the Priority field of the FC header with the VM tag, and forwards the resulting VM tagged FC frame from a port of host 102 to FC fabric 106.

FC fabric 106 forwards the FC frame to target HBA 122 via a port of target 104. HBA 122 unpacks the IO operation and associated VM tag from the FC frame, and forwards the IO operation and the VM tag to FC driver 126, which forwards the IO operation to LUN1 or LUN2 via SP 124. The VM tag provides for VM awareness to components of target 104 if they are priority tagging capable.

In the target-to-host (outbound) direction, LUN1 and LUN2 originate traffic, e.g., IO responses to IO requests, and forward the IO responses to FC driver 126 via SP 124. FC driver 126 forwards the IO responses to HBA 122. HBA 122 packages or encodes the IO responses into respective FC frames and forwards the FC frames from a port of target 104 to FC fabric 106. FC fabric 106 forwards the FC frames to host HBA 110. HBA 110 unpacks the IO responses from the respective FC frames, and forwards the IO responses to VMs 114 via hypervisor 112.

Figure 2:
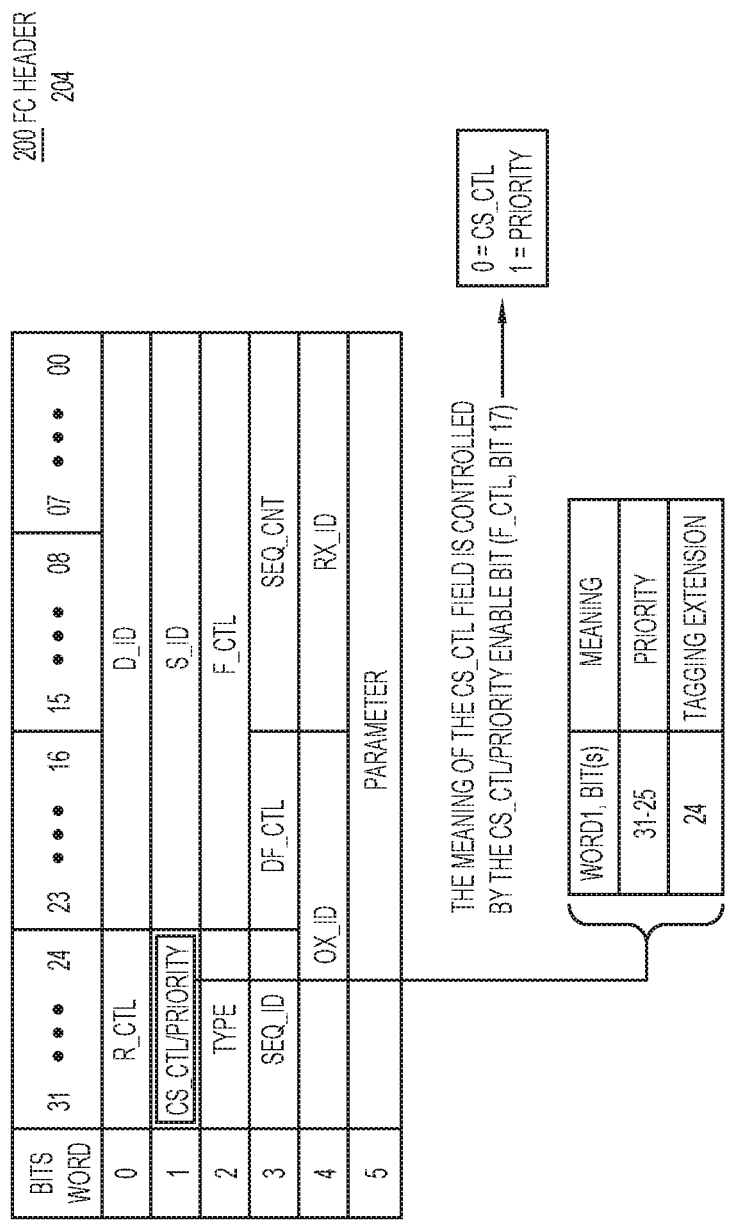
FIG. 2 shows a format for an FC header as defined in accordance with the FC T11 standards, according to example embodiment.

With reference to FIG. 2, there is shown a format of an example FC header 200 of an FC frame as defined in accordance with the T11 standards (FC-FS-5). As shown in FIG. 2, FC header 200 contains multiple fields including, but not limited to, respective fields for: an FC destination identifier (DID or D_ID); an FC source identifier (SID or S_ID); frame control (F_CTL); an originator exchange identifier (OX_ID or OXID); and a Priority field (also referred to as a class specific control (CS_CTL) field or simply "CS_CTL"). The meaning of the Priority field is controlled by the CS_CTL/priority enable bit, i.e., bit 17, of the F_CTL field, in the following manner: when F_CTL bit 17=0, the Priority field carries CS-CTL; when F_CTL bit 17=1, the Priority field carries priority.

As is also shown at 204 in FIG. 2: when the CS_CTL/ Priority field is set to priority, word 1, bits 31-25 of FC header 200 carry/are set to a priority value; and when the CS_CTL/Priority field is set to tagging extension, word 1, bit 24, and bits 25-35, may be used to carry a VM tag. The Priority field is variously used to resolve resource contention, determine the order to deliver FC frames, or to tag FC frames with VM tags. In the case where the Priority field carries priority, a sequence initiator function in either host 102 or target 104 sets the priority value to the same value for all FC frames in a given IO operation sequence, e.g., associated with a given IO operation.

With reference to FIG. 3, there are shown formats for common service parameters 302 used in a PLOGI/FLOGI ACC, and class service parameters 304 used in a PLOG/ FLOGI ACC as defined in accordance with T11 standards (FC-LS-3). Common service parameters 302 and class service parameters 304 are exchanged in FLOGI/PLOGI ACC exchanges 130-134 to indicate whether the originator of the Request/Accept Response (ACC) supports priority tagging (i.e., is priority tagging capable) or priority. The originator of the Request/Accept Response indicates that the originator supports priority tagging when both (i) the "priority tagging supported" field, word 1, bit 23, of common service parameters 302 is set to 1, and (ii) the "priority" field, word 0, bit 23 of the class service parameters 304 is set to 1. Otherwise, the originator does not fully support priority tagging. Additionally, the priority tagging supported field may be set to 1 only if the Priority field is set to 1.

Figure 4:
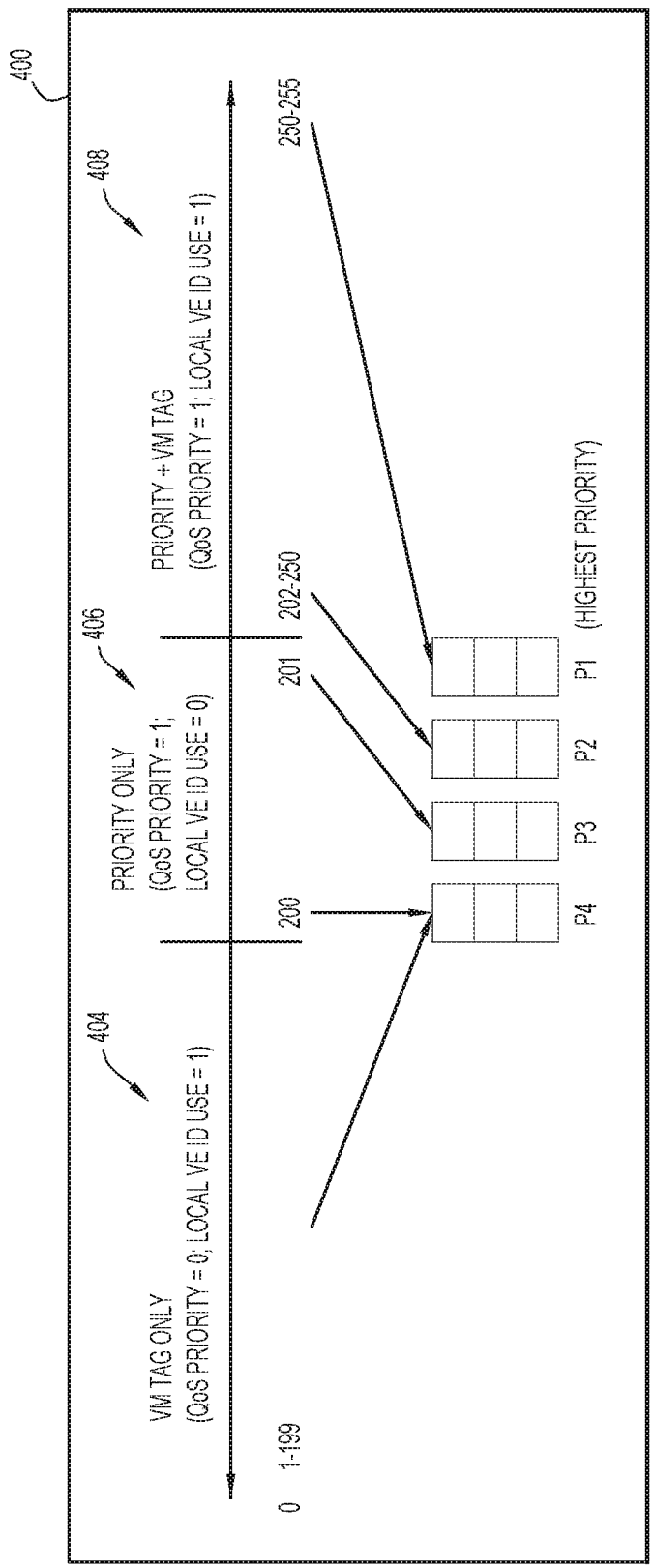
FIG. 4 is an illustration of a partitioning of a Priority field in an FC frame header into VM tag only, priority only, and combined priority and VM tag as defined in accordance with the T11 standards, according to an example embodiment.

With reference to FIG. 4, there is an illustration of an example partitioning 400 of the Priority field into different portions or partitions 404, 406, and 408 for priority tagging only (i.e., VM tag without priority), priority only (i.e., priority without VM tag), and combined priority and VM tag (i.e., priority with VM tag), respectively, as defined in accordance with the T11 standards (FC-LS-3). Partitioning 400 partitions the Priority field based on possible ranges of values that the field may carry, as follows: values in a range 1-199 represent VM tag only values that share a single or undifferentiated priority P4; values 200 and 201 represent priority only values mapped to priorities P4 and P3, respectively; and values in the ranges 202-255 represent combined VM tag and priority, specifically, VM tag values 202-250 and 250-255 map to respective priorities P2 and P1.

During an initial FC configuration or provisioning phase, an FC fabric administrator function may configure FC fabric 106 to support a particular partitioning, e.g., partitioning 400. Once so configured, FC-SAN environment 100 supports control plane messages through which host 102 and target 104 may discover the particular partitioning (e.g., partitioning 400) of the Priority field supported by FC fabric 106. The control plane messages may include an end device (e.g., host 102 or target 104) originated query fabric priority allocation (QFPA) request that requests the partitioning information from FC fabric 106, and an FC fabric originated QFPA ACC response to the request and that provides the requested partitioning information. Before data plane FC frames are exchanged, an end device sends the QFPA request to FC fabric 106, and the FC fabric responds with the QFPA response (ACC). Then, the end device populates the Priority field accordingly, i.e., in accordance with the partitioning indicated in the QFPA response. Returning to FIG. 1, such an exchange of QFPA messages between FC fabric 106 and host 102 is shown at 140.

In the example of FIG. 4, the QFPA ACC includes a pair of bits labeled "QoS priority" and "Local VEID," which have values (either 0 or 1) that indicate the partition of the Priority field. As shown in FIG. 4, the QoS priority and Local VEID bits indicate the partitioning of the Priority field as follows: (i) QoS priority=0, Local VE ID use=1→VM tag only; (ii) QoS priority=1, Local VE ID use=0→priority only; (i) QoS priority=1, Local VE ID use=1→combined priority and VM tag.

Problems associated with current priority tagging solutions are now briefly described, and then various embodiments that solve the problems are described. In the conventional FC-SAN environment, the server/host-side FC driver supports priority tagging (i.e., is priority tagging capable), and the FC switches also support priority tagging via priority tagging capable OS software hosted on the FC switches. On the other hand, the target-side FC driver may or may not support priority tagging (i.e., may or may not be priority tagging capable). Thus, the target-side does not fully support/advertise priority tagging. Given the many target (e.g., storage array) vendors in the market today, it may be many years before all of the vendors implement priority tagging, and thus many years before the ideal goal of a fully priority tagging capable FC fabric environment may be realized. Also, even if a select few target vendors do add priority tagging support, software refresh of the targets is not performed frequently enough to minimize a risk of data unavailability/loss due to upgrade failures. All of these factors are a hindrance to building FC-SAN-based solutions around the priority tagging feature. While the priority tagging feature can bring immense value in terms of VM-level visibility in the FC fabric, the incentive for target vendors to implement the priority tagging feature is limited because many of the target vendors rely on proprietary out-of-band mechanisms (e.g., vSphere APIs) to learn of VMs accessing storage LUNs provisioned on the target.

VM visibility in the FC fabric allows FC switches to offer advanced analytics at the granularity of a VM, detection and congestion isolation of slow draining VMs, and fabric policy (e.g., zoning, QoS, and the like) per VM. The T11 standards compliant server-side HBA priority tagging implementations do not enable priority tagging to a target unless the target advertises priority tagging capability during PLOGI, which the target may not do. Thus, while the FC fabric and the server-side FC HBA vendors implement priority tagging, the overall, end-to-end solution is incomplete.

Additionally, the server-side HBA may include a "Liberal Mode" configuration "knob" or setting, which, when set to "ON," causes the HBA to perform unconditional priority tagging of FC frames, irrespective of whether the target is priority tagging capable or not, and whether the target device advertises priority tagging capability or does not advertise priority tagging capability; however, the Liberal Mode is intended as a test feature and is set to "OFF" by default.

Accordingly, priority tagging embodiments are presented herein that overcome the aforementioned problems. The priority tagging embodiments overcome the above-mentioned limitations with respect to the priority tagging features, and thus provide the benefit of VM-level visibility in the FC fabric (e.g., FC fabric 106). The priority tagging embodiments do not require changes to the target FC driver (e.g., FC driver 126). Also, the Liberal Mode knob of priority tagging operation on the server-side HBA (e.g., HBA 110) may be set to ON by default for unconditional priority tagging of FC frames.

In the embodiments, reuse of the existing Priority field of the FC header as a VM tag means that target FC drivers (e.g., FC driver 126) do not necessarily need to do any additional header parsing for handling of the VM tag; however, care should be taken to ensure that the VM tag is not misinterpreted as a priority by the target (e.g., target 104) if the target is not priority tagging capable/aware, i.e., is unable to interpret the VM tag and handle it accordingly. A misinterpretation of the VM tag may result in targets providing differentiated services to IO operations based on the VM tag, which is not the intent.

Based on how various target-side FC drivers (e.g., FC driver 126) interpret the Priority field of the FC header, the FC drivers (and the targets that host the FC drivers) are classified as follows for purpose of the priority tagging embodiments presented below:
  Category-1 (CAT-1): These target FC drivers do not interpret the Priority field in request FC frames and retain its value in all response FC frames.
  Category-2 (CAT-2): These target FC drivers do not interpret the Priority field in request FC frames, but retention of this field in response FC frames is not guaranteed.
  Category-3 (CAT-3): These target FC drivers implement request FC frame prioritization based on the Priority field (when it carries a priority). The retention of the Priority value in the response FC frame is not guaranteed.

Both category-1 and category-2 targets do not offer frame prioritization services and all FC frames are treated equally. Since FC-SAN networks are no-drop networks, providing frame prioritization using the Priority field in the FC header was not a requirement traditionally. As a result most (>90%) of target implementations today belong to categories 1 and 2.

However, with the advent of faster flash based media, a need for frame prioritization in the FC fabric to match the low latency characteristic of storage media has resulted in some target vendor drivers implementing frame prioritization based on the Priority field. These targets belong to category-3.

Described below are priority tagging embodiments 1-3, which cater to the category 1-3 targets, respectively. Each priority tagging embodiment includes modifications to one or more of host 102, target 104, and FC fabric 106 specific to the category of target in order to accommodate the properties of the target. FIGS. 5, 6-7, and 8 described below correspond to priority tagging embodiments 1, 2, and 3 for category-1, -2, and -3 targets, respectively.

Figure 5:
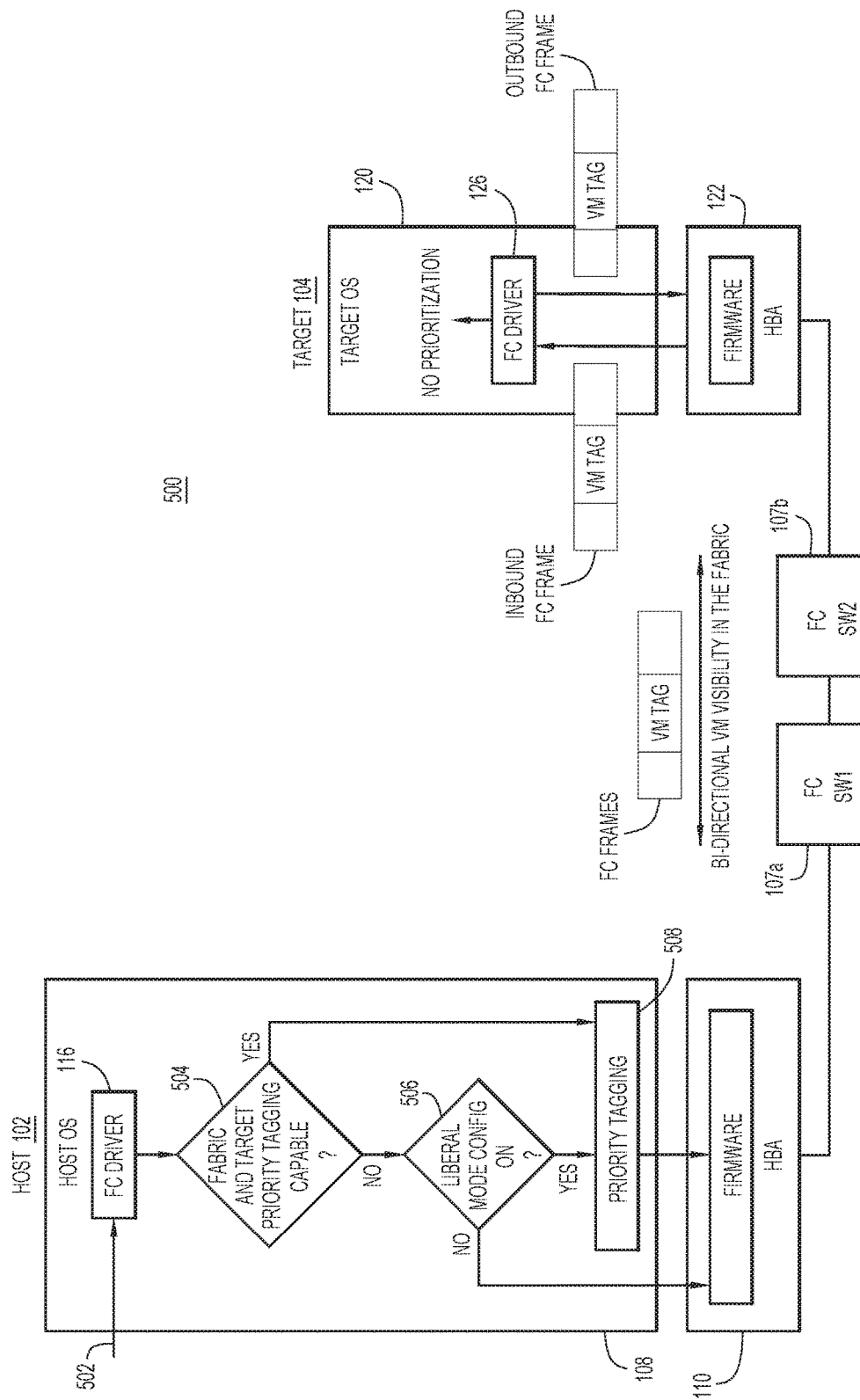
FIG. 5 is a block diagram of an FC fabric environment and a flowchart of a method representative of a first priority tagging embodiment (i.e., priority tagging embodiment 1) for a category-1 target, according to an example embodiment.

With reference to FIG. 5, there is a block diagram of an example FC-SAN environment 500 and a flowchart of a method (shown at operations 502-508) representative of priority tagging embodiment 1, in which target 104 is a category-1 target. As shown in FIG. 5, FC-SAN environment 500 represents FC-SAN environment 100 in which host 102 is modified specifically to operate with target 104 when it is a category-1 target. Priority tagging embodiment 1 includes a relatively small modification of host 102 to accommodate category-1 target device 104 because the target device ignores the VM tag. On the server-side, host 102 implements full priority tagging functionality when sending IO requests to target 104. This does not impact target 104, which ignores the VM tag.

Operations 502-508 depict a method of priority tagging FC frames performed primarily by HBA 110 of host 102, but some of the operations may also be performed by FC driver 116 of the host.

At 502, an FC frame originated at host 102 and destined for target 104 is received. The FC frame carries traffic originated at VMs 114, e.g., the FC frame may encode IO operations, such as read or write operations. The FC frame header includes an SID and a DID for host 102 and target 104, respectively, and also includes a Priority field.

At 504, host 102 determines/discovers whether FC fabric 106 (FC switches 107) and target 104 are both priority tagging capable, e.g., both support one or more of tagging of FC frames with a VM tag and/or interpreting the VM tag in a VM tagged frame. Host 102 may discover whether FC fabric 106 and target 104 are both priority tagging capable during FLOGI and PLOGI, as described above.

If both FC fabric 106 and target 104 are both priority tagging capable, flow proceeds from 504 to 508, where host 102 (e.g., HBA 110) performs priority tagging of the FC frame, i.e., the host populates or tags the Priority field with a VM tag provided by hypervisor 112, the HBA transmits the tagged FC frame to the FC fabric, and the method ends.

If both FC fabric 106 and target 104 are not both priority tagging capable, flow proceeds from 504 to 506, where host 102 determines whether the Liberal Mode is turned ON. If the Liberal Mode is turned ON, flow proceeds from 506 to 508, where host 102 performs priority tagging of the Priority field (i.e., the host priority tags the Priority field with the VM tag), transmits the tagged FC frame to the FC fabric, and the method ends. If the Liberal Mode is turned OFF, flow bypasses priority tagging so that host 102 does not priority tag the Priority field, and the host transmits the untagged FC frame to FC fabric 106 via HBA 110, and the method ends.

Accordingly, host 102 performs priority tagging of the FC frame for category-1 targets either when (i) both FC fabric 106 and target 104 support priority tagging, or (ii) the Liberal Mode is turned ON; otherwise, host 102 does not perform priority tagging. In other words, the Liberal Mode setting to ON is required only if a category-1 target does not advertise itself as priority tagging capable during, e.g., PLOGI. If the category-1 target advertises priority tagging, then the Liberal Mode configuration is ignored/bypassed, as shown in FIG. 5.

Figure 6:
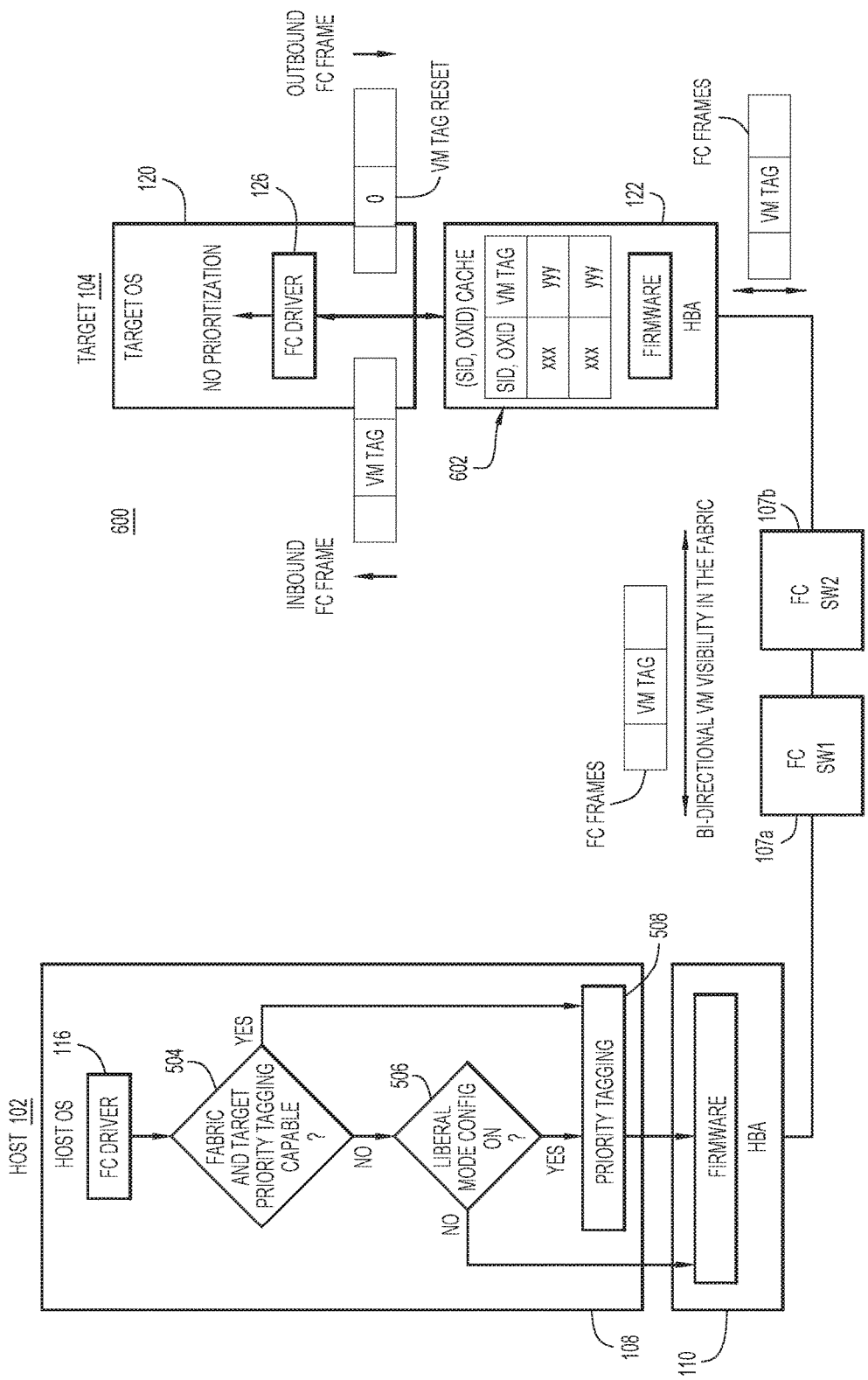
FIG. 6 is a block diagram of an FC fabric environment representative of a second priority tagging embodiment (i.e., priority tagging embodiment 2) for a category-2 target, according to an example embodiment.

With reference to FIG. 6, there is a block diagram of an example FC-SAN environment 600 representative of priority tagging embodiment 2, in which target 104 is a category-2 target. As shown in FIG. 6, FC-SAN environment 600 represents FC-SAN environment 100 modified specifically to operate with target 104 when it is a category-2 target. As shown, priority tagging embodiment 2 includes a modification to target HBA 122, and optionally retains the modification to host 102 described in connection with priority tagging embodiment 2.

A category-2 target, e.g., target 104, is not guaranteed to preserve a VM tag from an IO request carried in an FC frame (i.e., an IO request FC frame) as received from host 102 in a response to the IO request carried in an FC frame (i.e., an IO response FC frame) originated at the target. To account for this, target HBA 122 employs a VM tag caching mechanism that uses a VM tag cache 602 maintained in memory of the HBA to store an entry that maps the VM tag of the IO request FC frame received at HBA 122 to a tuple [source FCID (SID), originator exchange ID (OXID)] of the IO request FC frame. In the example of FIG. 6, cache 602 includes a table having rows of entries, each row/entry to store a mapping of SID, OXID, to the VM tag across respective columns of the table. Cache 602 may be implemented as a data structure that takes any form so long as the data structure provides the necessary mappings.

For each IO response FC frame emanating from target 104 (e.g., with Priority field=0), HBA 122 compares the tuple [destination FCID (DID), OXID] from the IO response FC frame against entries in cache 602, e.g., against the tuple [SID, OXID] mapped to the VM tag. If the compare results in a positive match, the Priority field of the IO response FC frame is repopulated with the VM tag stored in the cache. If the compare does not result in a match, the Priority field is not repopulated. The OXID is unique across all VMs 114 of a server (which is identified by its SID) (e.g., host 102) because the hypervisor (e.g., hypervisor 112) originates the IO operation on behalf of the VMs. As a result, the combination [SID, OXID] in the (inbound) host-to-target direction ensures a collision free cache 602 that can be used to repopulate the Priority field in the target-to-host direction. Also, because the VM tag is the same across all of the FC frames of a given IO exchange, if the VM tag is updated in cache 602 for a first or initial FC frame in the IO request (FCP_CMD frame) from the server (e.g., host 102), all further FC frames (FCP Data, Status frames) using the same OXID can be stamped with the same VM tag. This ensures the FC frame-by-frame priority tagging in the target-to-server direction is the same as that learned and cached in the server-to-target direction. HBA 122 invalidates the entry in cache 602 for a given IO exchange after a last or final FC frame of the IO exchange has been seen, i.e., has occurred. Cache 602 has a negligible performance impact in the data path (IO path) of HBA 122.

Figure 7:
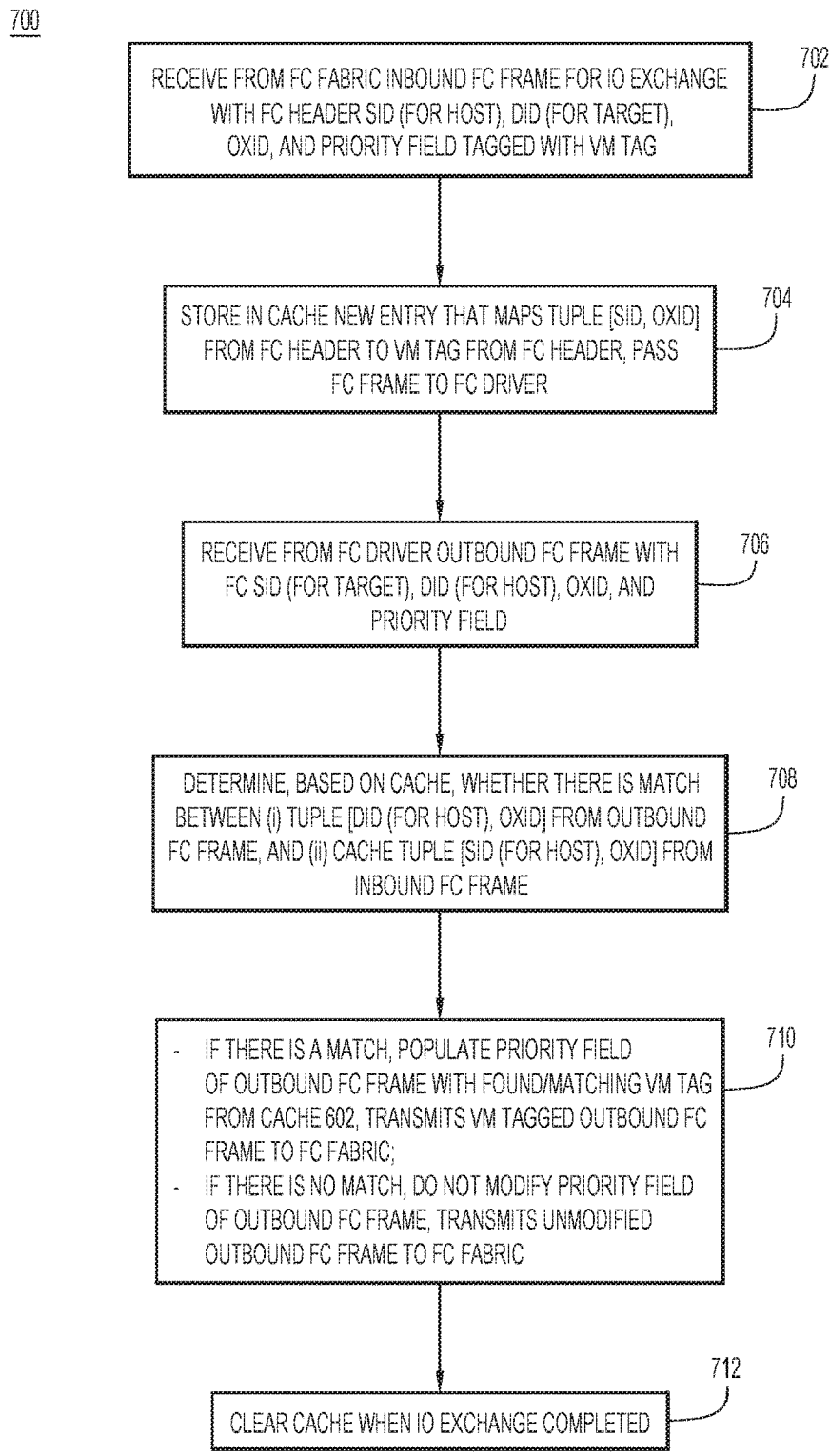
FIG. 7 is a flowchart of a method of implementing priority tagging embodiment 2 with a category-2 target, according to an example embodiment.

With reference to FIG. 7, there is a flowchart of an example method 700 of implementing priority tagging embodiment 2 with category-2 targets. Method 700 includes features described above and may be performed by HBA 122.

At 702, target HBA 122 receives from FC fabric 106 an inbound FC frame for an IO exchange originated from host 102 and destined for target 104. An FC header of the FC frame includes, but is not limited to, an SID (for host 102), a DID (for target 104), an OXID, and a Priority field tagged with a VM tag. HBA 122 maintains cache 602 having mapping entries, each entry to map a distinct tuple [SID, OXID] to a VM tag associated with the tuple.

At 704, HBA 122 stores in cache 602 a new entry that maps the tuple [SID, OXID] from the FC header to the VM tag from the FC header, and passes the FC frame to FC driver 126.

At 706, HBA 122 receives from FC driver 126 an outbound FC frame originated at target 104 and destined for host 102. The FC frame includes a header including, but not limited to, an SID (for target 104), a DID (for host 102), an OXID, and a Priority field, which may be populated with a zero value.

At 708, HBA 122 determines, based on the mappings in cache 602, whether there is a match between the tuple [DID (for host 102), OXID] from the outbound FC frame and the tuple [SID (for host 102), OXID] from the inbound FC frame as stored in the cache. For example, HBA 122 compares the tuple [DID (for host 102), OXID] from the outbound FC frame to each entry in cache 602.

At 710, if there is a match, HBA 122 populates the Priority field of the outbound FC frame with the associated/matching VM tag found in cache 602, and transmits the VM tagged outbound FC frame to FC fabric 106. If there is no match, HBA 122 does not modify the Priority field of the outbound FC frame, and transmits the unmodified outbound FC frame to FC fabric 106.

At 712, HBA 122 clears the entry in cache 602 for the IO exchange (see operation 706) when the IO exchange is complete.

All of the VM tag visibility related features in FC fabric 106, such as VM-based analytics/congestion isolation/policy, can be offered bi-directionally in the FC fabric for both category-1 and -2 targets using priority tagging embodiments 1 and 2, respectively.

Figure 8:
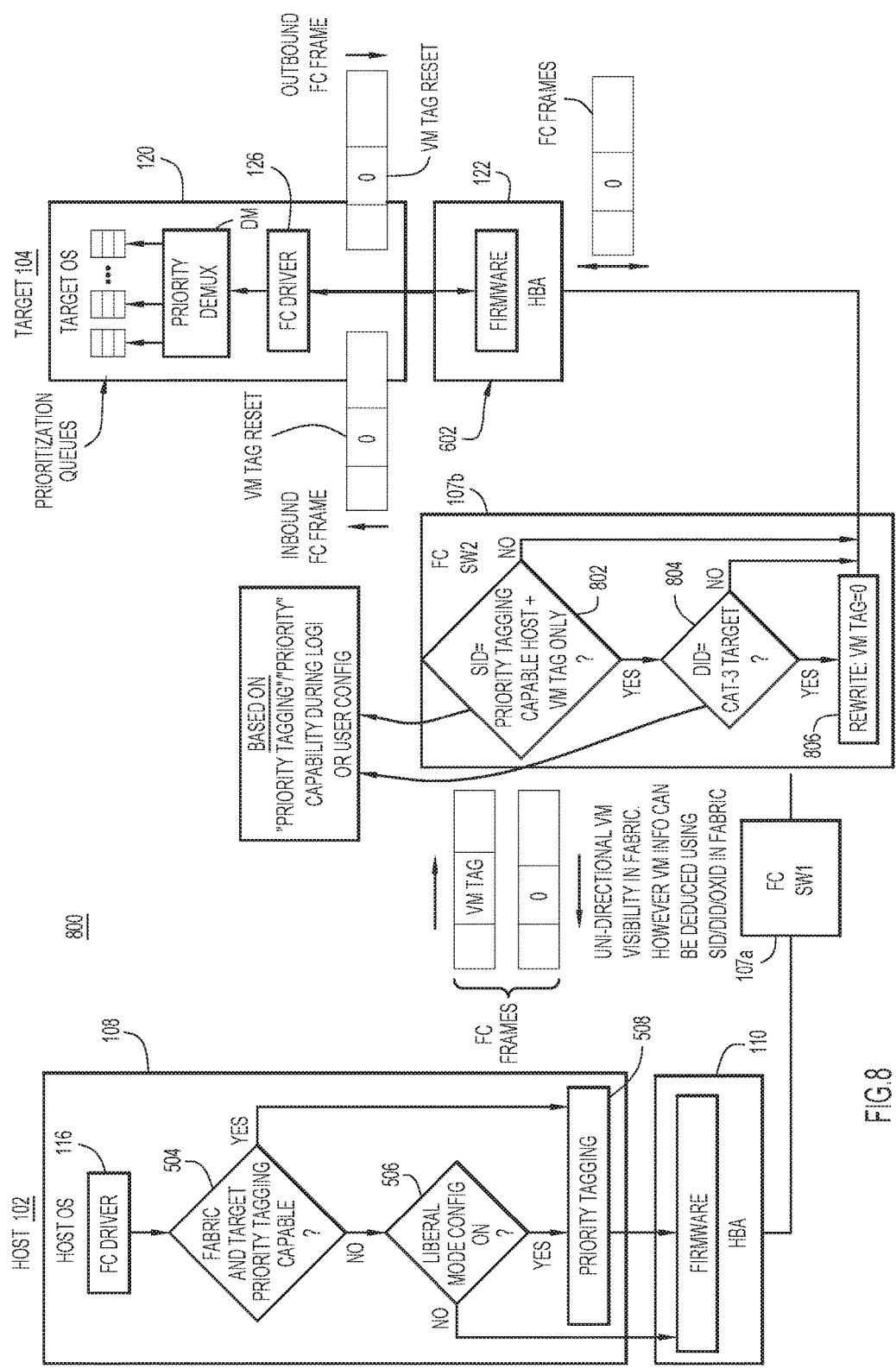
FIG. 8 is a block diagram of an FC fabric environment and a flowchart of a method representative of a third priority tagging embodiment (i.e., priority tagging embodiment 3) for a category-3 target, according to an example embodiment.

With reference to FIG. 8, there is a block diagram of an example FC-SAN environment 800 and a flowchart of a method (see operations 802-806) representative of priority tagging embodiment 3, in which target 104 is a category-3 target. As shown in FIG. 8, FC-SAN environment 800 represents FC-SAN environment 100 modified specifically to operate with target 104 when it is a category-3 target. Priority tagging embodiment 3 includes modifications to FC fabric 106 and optionally retains the modifications to host 102 from priority tagging embodiment 1.

When a category-3 target, target 104 includes a priority demultiplexer (DM) to direct inbound FC frame data received from FC driver 126 to appropriate ones of prioritization queues based on priorities of the FC frames carrying the data, as indicted in the Priority field of the FC frames. Thus, for a category-3 target, a VM tag stamped in the Priority field by host HBA 110 should not be sent to the target because it may misinterpret the VM tag as an FC frame priority. Accordingly, in priority tagging embodiment 3, FC fabric 106 performs a method of conditionally resetting or clearing the VM tag in inbound FC frames before their delivery to target HBA 122 and FC driver 126. FC fabric 106 performs the resetting only when the source of the FC frame (e.g., host 102) is a priority tagging capable host, because a non-priority tagging capable host may send to the target FC frames having the Priority field encoded with priority. The aforementioned reset of VM tag cannot be performed in target HBA 122 because inbound FC frames are usually transferred over a "fast path" (i.e. a path in which data is transferred to target memory using direct memory access (DMA)), where FC frame contents cannot be altered. Hence, the reset of VM tag before delivery to target FC driver 126 is performed in FC fabric 106.

The method of conditionally resetting the VM tags in FC frames uses as an initial input certain FC fabric information that indicates which targets connected to FC fabric 106 are category-3 targets. This input information is accessible from either configuration information or information discovered by FC switches 107. Armed with the aforementioned (input) information, FC fabric 106 uses the information to program access control list (ACL) entries at the exit ports of its FC fabric switches towards/facing the category-3 targets to reset the VM tag for inbound FC frames. This ensures that VM tag visibility is carried through FC fabric 106 up to the final exit ports from the FC fabric. The configuration or other information includes configuration or other information indicative of:
  a. Specific partitioning of the Priority field supported by FC fabric 106 (e.g., indicative of Priority field partitioning 400 described in connection with FIG. 4). An FC fabric administrative support function may program this information into FC fabric 106;
  b. Which hosts (i.e., servers) connected with FC fabric 106 are priority tagging capable (e.g., host 102) and are not priority tagging capable. FC fabric 106 discovers this information via FLOGI; and
  c. Which targets connected with the FC fabric are category-3 targets (e.g., target 104 in FIG. 8). For example, FC fabric 106 may be configured with a list of category-3 targets in terms of their port World Wide names (pWWNs)/FCIDs. This information may be distributed in FC fabric 106 using existing FC fabric distribution techniques, such as the Cisco Fabric Service (CFS).

The method of conditionally resetting the VM tags in FC fabric 106 includes operations 802-806 described below, and may be performed by the one of FC switches 107 that is connected to the target device (e.g., FC switch 107b) so that VM visibility is maintained until a final exit point of the FC fabric 106. The FC switch performs the method for each (inbound) FC frame originated at host 102 and destined for target 104.

At 802, the FC switch (i) determines whether (i) the SID in the FC header of the FC frame identifies a priority tagging capable host (e.g., host 102) based on the FC fabric information discovered as mentioned above, and (ii) determines whether the Priority field carries a VM tag only (i.e., a VM tag without priority) based on the configuration information (e.g., Priority partitioning information). In an example in which partitioning of the Priority field follows partitioning 400 shown in FIG. 4, test (ii) determines whether the Priority field carries a value in the VM tag range of 1-199.

If both determinations (i) and (ii) do not pass (i.e., either the SID in the FC header of the FC frame does not identify a priority tagging capable host, or the Priority field does not carry a VM tag only—but rather carries priority), the FC switch delivers the FC frame to target 104 without modifying the Priority field, i.e., without resetting the Priority field, and the method ends.

If both determinations (i) and (ii) pass (i.e., the SID in the FC header of the FC frame identifies a priority tagging capable host, and the Priority field carries a VM tag only), flow proceeds from 802 to 804, where the FC switch determines whether the DID in the FC header of the FC frame identifies a category-3 target based on the configuration information. If the DID does not identify a category-3 target, the FC switch delivers the FC frame to target 104 without modifying the Priority field, and the method ends. If the DID identifies a category-3 target, flow proceeds from 804 to 806, where the FC switch resets the VM tag in the Priority field to zero (i.e., clears the Priority field), and delivers the FC frame with the reset VM tag to target 104, and the method ends. The conditional logic leading to a reset of the VM tag by the FC switch is as follows:
  If ((SID==priority tagging capable host) AND (DID (Category-3 Target) AND (Priority value==VM tag range))
     →Rewrite (Priority field=0).

The conditional logic may be programmed as an ACL entry in a port of the FC switch. In a case where the FC switch does not have a capability to rewrite FC frames via an egress ACL associated with an egress port of the FC switch, the FC switch performs the resetting via an ingress ACL associated with an ingress port of the FC switch, where the ingress port is facing target 104, including any of the Inter-Switch-Link ports (ISL) (E-ports) toward the target. Since in this case the VM tag reset occurs only after all VM tag related functionality has been performed in the ingress port, there is minimal or no loss of VM visibility in the host-to-target direction. Also if the ACL is programmed in the ingress direction towards the target, it may be programmed on all the ISL ports in case of a multihop topology, or on a server/host connected edge port (F-port) in case of a single switch topology.

The above described Inter-Switch-Link ports (E-ports) embodiment 3 for category-3 devices provides VM tag visibility in the server-to-target direction only; however, FC fabric 106 based Inter-Switch-Link ports (E-ports) features, such as VM based analytics, involve matching request and responses involving the OXID of the FC frame, which can be used to recompute the VM tag in the reverse direction, i.e., in the target-to-host direction.

Figure 9:
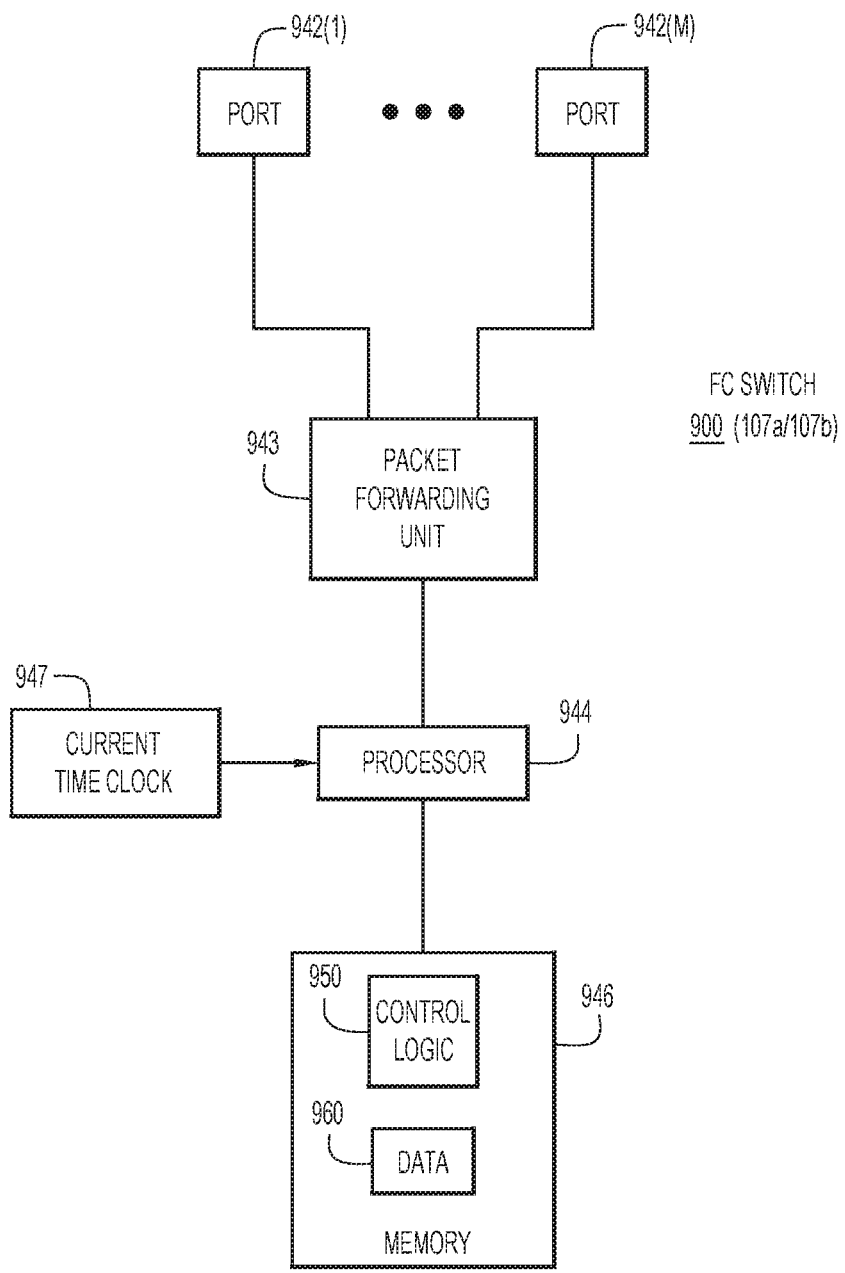
FIG. 9 is a hardware block diagram of an FC switch of an FC fabric, according to an example embodiment.

With reference to FIG. 9, there is a block diagram of an example FC switch 900 representative of each of FC switches 107. Switch 900 comprises a plurality of FC ports 942(1)-942(M) to send FC frames/packets to a network (including, e.g., other FC switches in FC fabric 106, server 102, and target 104) and receive FC frames/packets from the network, a packet forwarding/processing unit 943, a network processor 944 (also referred to simply as "processor"), a memory 946, and a current time clock 947 configured to provide time stamps to the ports and/or the network processor. The packet forwarding/processing unit 943 is, for example, one or more application specific integrated circuits that include buffers, queues, and other control logic for performing packet forwarding operations. The packet forwarding/processing unit may include TCAMs for storing ACL entries as described above. The processor 944 is a microcontroller or microprocessor that is configured to perform higher level controls of switch 106. To this end, the memory 946 stores software instructions that, when executed by the processor 944, cause the processor 944 to perform a variety of operations including operations described herein. For example, the memory 946 stores instructions for control logic 950 to perform methods described herein. Memory 946 also stores data 960 used and generated by control logic 950. Such data includes, but is not limited to, ACL rules, VM tags, SIDs, DIDs, FLOGI results, Priority partitioning information, and so on.

Memory 946 may comprise read only memory (ROM), random access memory (RAM), magnetic disk storage media devices, optical storage media devices, flash memory devices, electrical, optical, or other physical/tangible memory storage devices. Thus, in general, the memory 946 may comprise one or more tangible (e.g., non-transitory) computer readable storage media (e.g., a memory device) encoded with software comprising computer executable instructions and when the software is executed (by the processor 944) it is operable to perform the operations described herein in connection with logic 950.

Figure 10:
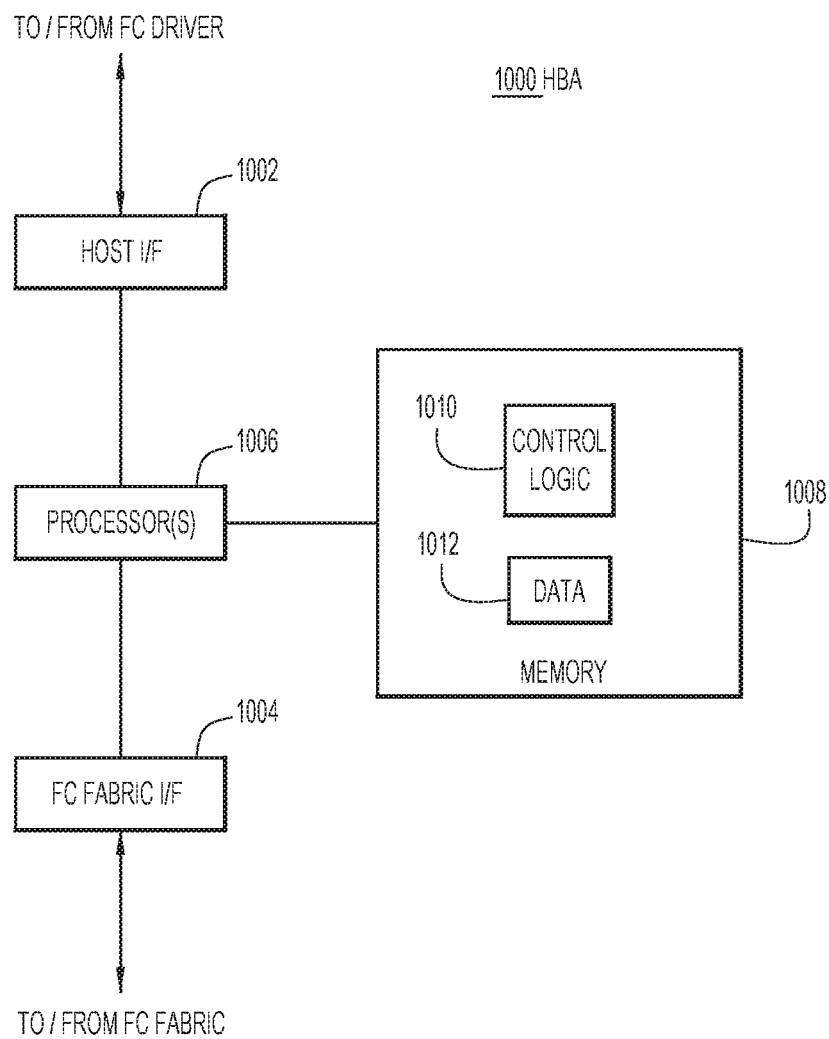
FIG. 10 there is a high-level hardware block diagram of a host bus adapter (HBA) associated with either a host-side or a target-side of an FC-SAN, according to an example embodiment.

With reference to FIG. 10, there is a high-level block diagram of an example HBA 1000, representative of HBAs 110 and 122. HBA 1000 includes a host interface (I/F) 1002 to communicate bi-directionally with an FC driver (e.g., FC driver 116 or 126), an FC fabric I/F 1004 to communicate bi-directionally with FC fabric 106, a processor 1006, and a memory 1008. The aforementioned components of HBA 100 may include one or more application specific integrated circuits that include transmit and receive buffers, queues, control logic, and firmware for performing HBA operations described herein. Processor 1006 may be a microcontroller or microprocessor that is configured to perform high level control of HBA 1000, assist with data (frame) transfers between interfaces 1002 and 1004. Memory 1008 stores software and/or firmware instructions that, when executed by processor 1006, cause the processor to perform a variety of operations including operations described herein. For example, memory 1008 stores instructions for control logic 1010 to perform methods described herein. Memory 1008 also stores data 1012 used and generated by control logic 1010. Such data includes, but is not limited to, FC frame information, VM tags, SIDs, DIDs, cache 106, and so on.

Memory 1008 may comprise read only memory (ROM), random access memory (RAM), flash memory devices, electrical, optical, or other physical/tangible memory storage devices. Thus, in general, memory 1008 may comprise one or more tangible (e.g., non-transitory) computer readable storage media (e.g., a memory device) encoded with software comprising computer executable instructions and when the software is executed (by processor 1006) it is operable to perform the operations described herein in connection with logic 1010.

Figure 11:
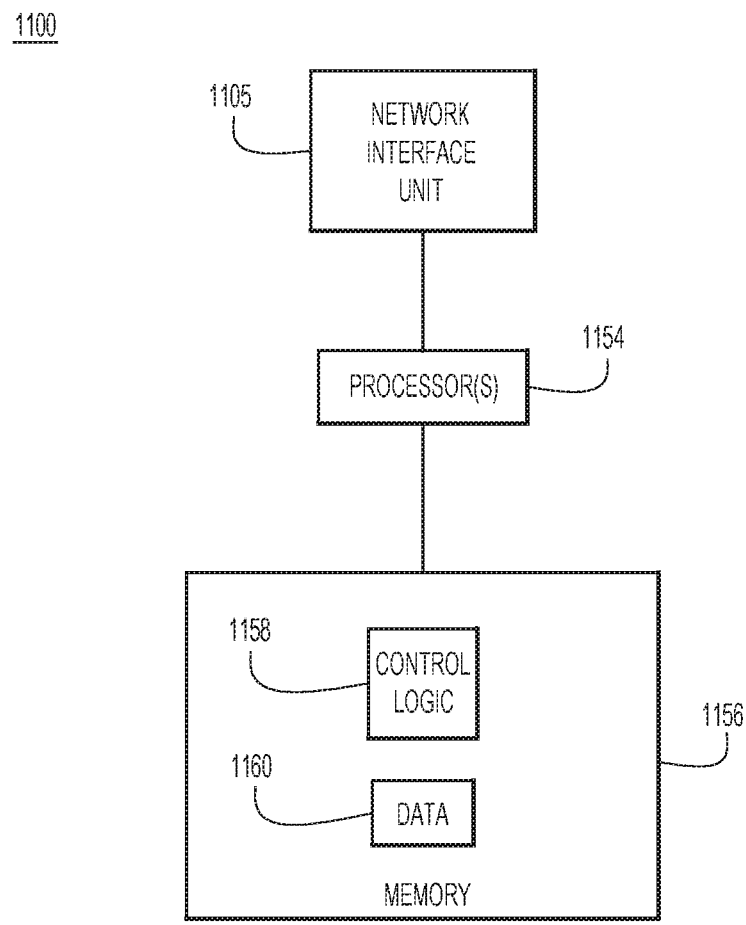
FIG. 11 is a hardware block diagram of a server device configured to host an FC driver, a hypervisor, and VMs, according to an example embodiment.

FIG. 11 is a hardware block diagram of an example computer device 1100 representative of host 102 and configured to host a host operating system, an FC driver, a hypervisor, and VMs. Computer device 1100 includes network interface unit 1105 to communicate with a communication network. Computer device 1100 also includes a processor 1154 (or multiple processors, which may be implemented as software or hardware processors), and memory 1156. Network interface unit 1105 may include an Ethernet card with a port (or multiple such devices) to communicate over wired Ethernet links and/or a wireless communication card with a wireless transceiver to communicate over wireless links. Network interface unit 1105 may be configure to provide connectivity with an HBA.

Memory 1156 stores instructions for implementing methods described herein. Memory 1156 may include read only memory (ROM), random access memory (RAM), magnetic disk storage media devices, optical storage media devices, flash memory devices, electrical, optical, or other physical/tangible (non-transitory) memory storage devices. The processor 1154 is, for example, a microprocessor or a microcontroller that executes instructions stored in memory. Thus, in general, the memory 1156 may comprise one or more tangible computer readable storage media (e.g., a memory device) encoded with software comprising computer executable instructions and when the software is executed (by the processor 1154) it is operable to perform the operations described herein. For example, memory 1156 stores control logic 1158 to perform operations for host device 102 as described herein (e.g., a host OS and an FC driver). The memory 1156 may also store data 1160 used and generated by logic 1158.

In summary, in one form, a method is provided comprising: at a host bus adapter of a target device, the host bus adapter associated with a Fibre Channel driver of the target device and connected to a Fibre Channel switch fabric: first receiving from the Fibre Channel switch fabric an inbound frame having a Fibre Channel header including a source identifier and a virtual machine (VM) tag; storing in a memory a mapping between the source identifier and the VM tag; passing the inbound frame to the Fibre Channel driver; second receiving from the Fibre Channel driver an outbound frame having a Fibre Channel header including a destination identifier; determining, based on the mapping, whether there is a match at least between the source identifier of the inbound frame and the destination identifier of the outbound frame; and if there is a match, tagging the Fibre Channel header of the outbound frame with the VM tag, and transmitting the tagged outbound frame to the Fibre Channel switch fabric.

In another form, an apparatus is provided comprising: a host bus adapter of a target device, the host bus adapter associated with a Fibre Channel driver of the target device and configured to be connected to a Fibre Channel switch fabric, the host bus adaptor configure to: first receive from the Fibre Channel switch fabric an inbound frame having a Fibre Channel header including a source identifier and a virtual machine (VM) tag; store in a memory a mapping between the source identifier and the VM tag; pass the inbound frame to the Fibre Channel driver; second receive from the Fibre Channel driver an outbound frame having a Fibre Channel header including a destination identifier; determine, based on the mapping, whether there is a match at least between the source identifier of the inbound frame and the destination identifier of the outbound frame; and if there is a match, tag the Fibre Channel header of the outbound frame with the VM tag, and transmit the tagged outbound frame to the Fibre Channel switch fabric.

In a further form, a method is provided comprising: receiving at a Fibre Channel switch of a switch fabric a frame originated at a host device connected to the switch fabric and destined for a target device connected to the switch fabric, the frame having a Fibre Channel header including a Priority field; determining whether the host device performs priority tagging of the Priority field, and determining whether the Priority field carries a VM tag without priority; and if the host device performs the priority tagging and the Priority field carries the VM tag without priority: determining whether the target device uses the Priority field for frame prioritization; and if the target device uses the Priority field for the frame prioritization, clearing the VM tag without priority from the Priority field, and forwarding the frame to the target device.

In yet another form, a non-transitory computer readable medium is provided. The computer readable medium is encoded with instruction that, when executed by a processor, cause the processor to perform each method described herein.

The above description is intended by way of example only. Various modifications and structural changes may be made therein without departing from the scope of the concepts described herein and within the scope and range of equivalents of the claims.

What is claimed is:

1. A method comprising:
   at a host bus adapter of a target device, the host bus adapter associated with a Fibre Channel driver of the target device and connected to a Fibre Channel switch fabric:
   first receiving from the Fibre Channel switch fabric an inbound frame having a Fibre Channel header including a source identifier and a virtual machine (VM) tag;
   storing in a memory a mapping between the source identifier and the VM tag;
   passing the inbound frame to the Fibre Channel driver;
   second receiving from the Fibre Channel driver an outbound frame having a Fibre Channel header including a destination identifier;
   determining, based on the mapping, whether there is a match at least between the source identifier of the inbound frame and the destination identifier of the outbound frame; and
   if there is a match, tagging the Fibre Channel header of the outbound frame with the VM tag, and transmitting the tagged outbound frame to the Fibre Channel switch fabric.

2. The method of claim 1, further comprising, if there is no match, not tagging the Fibre Channel header of the outbound frame with the VM tag, and transmitting the outbound frame to the Fibre Channel switch fabric.

3. The method of claim 1, wherein:
   the Fibre Channel header of the inbound frame further includes an originator exchange identifier;
   the mapping includes a mapping of both the source identifier and the originator exchange identifier of the inbound frame to the VM Tag;
   the Fibre Channel header of the outbound frame further includes an originator exchange identifier; and
   the determining includes determining, based on the mapping, whether the source identifier and the originator exchange identifier of the inbound frame match the destination identifier and the originator exchange identifier of the outbound frame, respectively.

4. The method of claim 1, wherein:
   the Fibre Channel header of the inbound frame includes a Priority field populated with the VM tag; and
   the tagging includes tagging a Priority field of the Fibre Channel header of the outbound frame with the VM tag.

5. The method of claim 1, wherein:
   the second receiving includes receiving the outbound frame to include a cleared Priority field.

6. The method of claim 1, wherein:
   the first receiving includes receiving the inbound frame to include an Input-Output (IO) request originating at a host device connected to the Fibre Channel switch fabric as identified by the source identifier and that hosts a virtual machine as identified by the VM tag; and
   the second receiving includes receiving the outbound frame to include an IO response to the IO request and that is destined for the host device.

7. The method of claim 6, wherein the inbound frame and the outbound frame are among a sequence of frames comprising an IO exchange between the host device and the target device and that terminates with a final frame of the IO exchange, and the method further comprises invalidating the mapping after the final frame is exchanged.

8. The method of claim 1, further comprising, at a host device configured to host a virtual machine identified by the VM tag and to connect with the Fibre Channel switch fabric through a host bus adapter of the host device:
   discovering whether the Fibre Channel switch fabric and the target device are each priority tagging capable such that each is configured to perform either priority tagging of a Priority field of frames or interpreting of the Priority field as a VM tag; and
   if the Fibre Channel switch fabric and the target device are both priority tagging capable, performing priority tagging of frames carrying traffic originated at the virtual machine and destined for the target device via the Fibre Channel switch fabric.

9. The method of claim 8, further comprising:
   if the Fibre Channel switch fabric and the target device are not both priority tagging capable:
   testing whether a Liberal Mode of the host device is set to ON or OFF; and
   if the Liberal Mode is either ON or OFF, either performing the priority tagging of the frames or not performing the priority tagging of the frames, respectively.

10. The method of claim 8, wherein the discovering whether the Fibre Channel switch fabric and the target device are each priority tagging capable includes:
    discovering whether the Fibre Channel switch fabric is priority tagging capable as a result of performing a Fabric login procedure with the Fibre Channel switch fabric; and
    discovering whether the target device is priority tagging capable as a result of performing a port login procedure with the target device.

11. An apparatus comprising:
    a host bus adapter of a target device, the host bus adapter associated with a Fibre Channel driver of the target device and configured to be connected to a Fibre Channel switch fabric, the host bus adaptor configured to:
    first receive from the Fibre Channel switch fabric an inbound frame having a Fibre Channel header including a source identifier and a virtual machine (VM) tag;
    store in a memory a mapping between the source identifier and the VM tag;
    pass the inbound frame to the Fibre Channel driver;
    second receive from the Fibre Channel driver an outbound frame having a Fibre Channel header including a destination identifier;

determine, based on the mapping, whether there is a match at least between the source identifier of the inbound frame and the destination identifier of the outbound frame; and if there is a match, tag the Fibre Channel header of the outbound frame with the VM tag, and transmit the tagged outbound frame to the Fibre Channel switch fabric.

12. The apparatus of claim 11, wherein the host bus adaptor is further configured to, if there is no match, not tag the Fibre Channel header of the outbound frame with the VM tag, and transmit the outbound frame to the Fibre Channel switch fabric.

13. The apparatus of claim 11, wherein:

the Fibre Channel header of the inbound frame further includes an originator exchange identifier;

the mapping includes a mapping of both the source identifier and the originator exchange identifier of the inbound frame to the VM Tag;

the Fibre Channel header of the outbound frame further includes an originator exchange identifier; and the host bus adapter is configured to determine by determining, based on the mapping, whether the source identifier and the originator exchange identifier of the inbound frame match the destination identifier and the originator exchange identifier of the outbound frame, respectively.

14. The apparatus of claim 11, wherein:

the Fibre Channel header of the inbound frame includes a Priority field populated with the VM tag; and the host bus adapter is configured to tag by tagging a Priority field of the Fibre Channel header of the outbound frame with the VM tag.

15. The apparatus of claim 14, wherein the inbound frame and the outbound frame are among a sequence of frames comprising an IO exchange between a host device and the target device and that terminates with a final frame of the IO exchange, and the host bus adapter further comprises invalidating the mapping after the final frame is exchanged.

16. A method comprising:

receiving at a Fibre Channel switch of a switch fabric a frame originated at a host device connected to the switch fabric and destined for a target device connected to the switch fabric, the frame having a Fibre Channel header including a Priority field;

determining whether the host device performs priority tagging of the Priority field, and determining whether the Priority field carries a VM tag without priority; and if the host device performs the priority tagging and the Priority field carries the VM tag without priority:

determining whether the target device uses the Priority field for frame prioritization; and if the target device uses the Priority field for the frame prioritization, clearing the VM tag without priority from the Priority field, and forwarding the frame to the target device.

17. The method of claim 16, further comprising:

if the host device does not perform the priority tagging or if the Priority field does not carry the VM tag without priority, not performing the clearing the VM tag without priority, and forwarding the frame to the target device.

18. The method of claim 16, wherein the determining whether the target device uses the Priority field for the frame prioritization includes accessing information in the switch fabric and that indicates whether the target device uses the Priority field for frame prioritization.

19. The method of claim 16, wherein the Fibre Channel switch is configured to recognize a partitioning of the Priority field into one of VM tag only, priority only, and combined VM tag and priority, and the determining whether the Priority field carries the VM tag without priority includes determining whether the Priority field is partitioned into the VM tag only.

20. The method of claim 16, wherein the Fibre Channel switch is configured to recognize a partitioning of the Priority field into multiple value ranges, including a first value range for VM tag only, a second value range for priority only, and a third value range for combined VM tag and priority, and the determining whether the Priority field carries the VM tag without priority includes determining whether the Priority field carries a value in the first value range but not in the second value range and not in the third value range.

* * * * *